(12) United States Patent
Mertz (10) Patent No.: US 7,393,100 B2
(45) Date of Patent: Jul. 1, 2008

(54) EYEWEAR FOR VIEWING LIQUID CRYSTAL DISPLAYS

(76) Inventor: Pierre Mertz, 666 Hope St., #2, Mountain View, CA (US) 94041

(\*) Notice: Subject to any disclaimer, the term of this patent is extended or adjusted under 35 U.S.C. 154(b) by 304 days.

(21) Appl. No.: 11/313,883

(22) Filed: Dec. 20, 2005

(65) Prior Publication Data

US 2006/0146275 A1 Jul. 6, 2006

Related U.S. Application Data

(60) Provisional application No. 60/595,053, filed on Jun. 2, 2005, provisional application No. 60/593,256, filed on Dec. 28, 2004.

(51) Int. Cl.
*G02C 7/10* (2006.01)
(52) U.S. Cl. .................................. 351/163; 351/165
(58) Field of Classification Search ................ 351/163, 351/165, 159, 164, 166; 359/580–590
See application file for complete search history.

(56) References Cited

U.S. PATENT DOCUMENTS

| | | | |
|---|---|---|---|
| 3,963,330 A * | 6/1976 | Boniuk | ........................ 351/163 |
| 4,829,492 A | 5/1989 | Choi et al. | |
| 5,113,285 A | 5/1992 | Franklin et al. | |
| 5,686,975 A | 11/1997 | Lipton | |
| 5,973,760 A | 10/1999 | Dehmlow | |
| 6,811,727 B2 * | 11/2004 | Havens et al. | ................ 252/586 |
| 2004/0046927 A1 | 3/2004 | Montgomery | |
| 2005/0099588 A1 | 5/2005 | Helpern et al. | |

\* cited by examiner

*Primary Examiner*—Hung X Dang
(74) *Attorney, Agent, or Firm*—DLA Piper US LLP (57) ABSTRACT

Eyewear which preferentially transmits light from a liquid crystal display screen using spectral filtering, polarization filtering and/or spatial filtering. The eyewear transmits the relatively narrow red, green, and blue bands of light emitted by the display's fluorescent backlight lamp, while blocking ambient light falling outside of those relatively narrow bands of light. The eyewear can further include polarized lenses oriented at either + or –45 degrees, matching the polarization of the liquid crystal display emission, and thus blocking ambient light not matching that polarization orientation. The glasses can also be tinted except for a central portion matching the shape of the rectangular liquid crystal display screen, and thus preferentially blocking light not originating from the liquid crystal display screen.

14 Claims, 9 Drawing Sheets

EYEWEAR FOR VIEWING LIQUID CRYSTAL DISPLAYS

This application claims the benefit of U.S. Provisional Application No. 60/593,256, filed Dec. 28, 2004, and U.S. Provisional Application No. 60/595,053, filed Jun. 2, 2005.

FIELD OF THE INVENTION

The present invention relates to outdoor viewing of liquid crystal displays (LCD's), and particularly to eyewear that aids the outdoor viewing of liquid crystal displays.

BACKGROUND OF THE INVENTION

Liquid crystal displays (LCD's) are well known and typically used as the visual display screen for laptop (notebook) computers. LCD's are often (but not necessarily) backlit devices that utilize a plurality of pixels, each of which selectively allows light (either monochrome or selective colors) to pass therethrough to form images on the LCD screen. To simplify the following discussion, the present invention will be discussed in terms of outdoor viewing of laptop LCD screens; however, it will be apparent to those skilled in the art from the following discussion that the present invention may be applied to viewing other types of liquid crystal displays such as those in cell phones, camcorders, DVD players, electronic game devices, or navigation screens, and in other high brightness environments, such as in a car, plane, boat, or an office with windows.

Laptop displays, when viewed indoors, seem bright, since the light they emit is comparable or greater than typical indoor ambient light. The pupil enlarges in the low ambient indoor light levels, allowing more of the light from the laptop display to hit the retina. The enlarged pupil makes the white level of the LCD appear brighter. In addition, the reflection of indoor ambient light off the screen, often referred to as screen glare, is low compared to the brightness of the screen. This low glare allows the black level of the screen to be darker, and thus leads to a high contrast visual display.

When viewed outdoors in the daylight, however, the ambient light (even in the shade) can be brighter than a typical laptop display, making the images on the display difficult to see. The pupil shrinks in high level outdoor ambient light, preventing much of the light from the laptop display from hitting the retina, so the white level of the LCD appears darker. In addition, the glare off the screen from the bright ambient light is stronger, preventing the black levels from being dark. This combination leads to a low contrast visual display, and can be so low as to render the display unusable in that ambient light environment. Therefore, state of the art laptop screens are mostly used indoors or outside only when the ambient light levels are relatively low.

There are some prior art displays designed to be viewed outdoors, which use reflective or transflective elements that reflect ambient light through the pixels. These displays actually use the ambient light as the source of light for operation instead of or in addition to the backlight. As ambient light increases, so does the brightness of the display. However, these displays work well only at certain angles to the ambient light source, and have reduced brightness indoors. Thus, these types of displays are not typically used in laptop displays.

Therefore, it is desirable to provide a system and method to enable laptops and other devices with liquid crystal displays to be used outdoors by increasing the ratio of laptop display brightness to ambient light and reducing screen glare from bright ambient light.

It is further desirable that the system be simple, inexpensive, stylish, small and lightweight, use no power, work with any laptop, and not modify the laptop in any way.

SUMMARY OF THE INVENTION

The invention comprises eyewear which selectively passes emitted light from the liquid crystal display while filtering out ambient light by using spectral filtering, polarization filtering, and/or spatial filtering.

Eyewear for wearing over a user's eyes can include an eyeglass frame and lenses supported by the frame. At least one of material forming the lenses and one or more optical coatings on the lenses are configured to generally transmit three separate visible bands of light while generally blocking any ambient visible light not within the three visible bands of light.

A method of a user viewing an LCD screen that emits light primarily in three emission bands includes placing eyewear over the user's eyes, and viewing the LCD screen through lenses of the eyewear. The eyewear includes an eyeglass frame and lenses supported by the frame. At least one of material forming the lenses and one or more optical coatings on the lenses are configured to generally transmit three separate visible bands of light that overlap with the three emission bands of the LCD screen and to generally block any ambient visible light not within the three visible bands of light. The three emission bands of light are generally transmitted by the lenses while ambient visible light not within the three visible bands of light is generally blocked by the lenses.

Other objects and features of the present invention will become apparent by a review of the specification, claims and appended figures.

DETAILED DESCRIPTION OF THE PREFERRED EMBODIMENTS

The present invention is eyewear, for viewing liquid crystal display (LCD's) in bright ambient light, that utilize spectral, spatial and/or polarization filtering to reduce ambient light and/or glare entering the user's eyes without excessively reducing or attenuating the light that produces images on the LCD screen.

Figure 1:
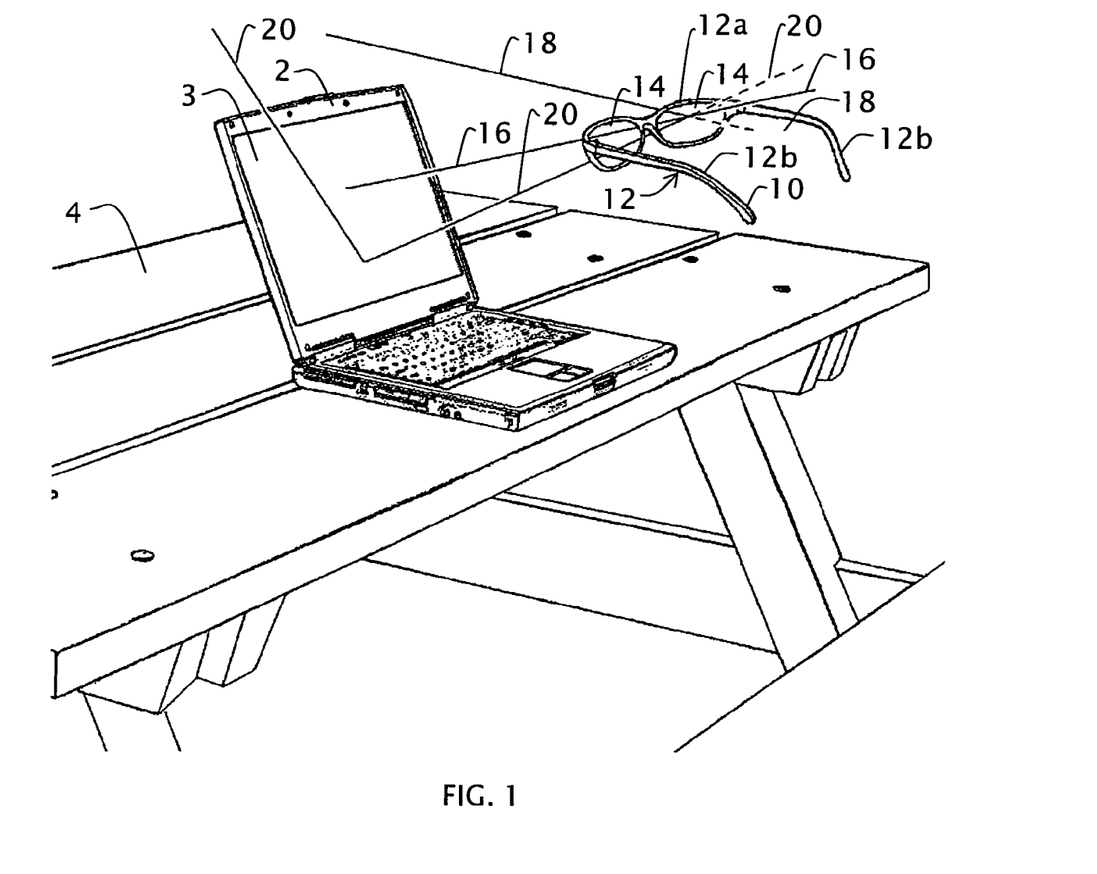
FIG. 1 is a perspective view illustrating the eyewear in an outdoor environment that selectively transmits light from the liquid crystal display in the laptop while filtering out ambient light and glare.

The purpose of the present invention may be more easily understood with reference to FIG. 1. The eyewear 10 is designed for outdoor viewing of a liquid crystal display 3, when for example using a laptop computer 2 on a picnic table 4. The eyewear 10 includes a conventional eyeglass frame 12 to be worn by a user and lenses 14 which transmit light 16 produced by the laptop display 3. Eyeglass frames 12 are well known in the art, and include a front portion 12a for supporting the lenses 14, and stems 12b extending away from the front portion 12a for engaging with the user's ears and holding the front portion 12a over the user's eyes in a level manner. The lenses 14 are made of a material and/or include one or more optical coatings that disproportionately attenuate both the ambient light 18 and screen glare 20 (ambient light 18 reflected off the liquid crystal display 3), in comparison to the light 16 produced by the display 3, as explained in more detail below. Thus, the light entering the retina of a user wearing the eyewear 10 will have a higher ratio of the light 16 produced by the laptop display 3 relative to the ambient light 18 and glare 20 than if the user were not wearing the eyewear 10.

Spectral Filtering

Figure 2:
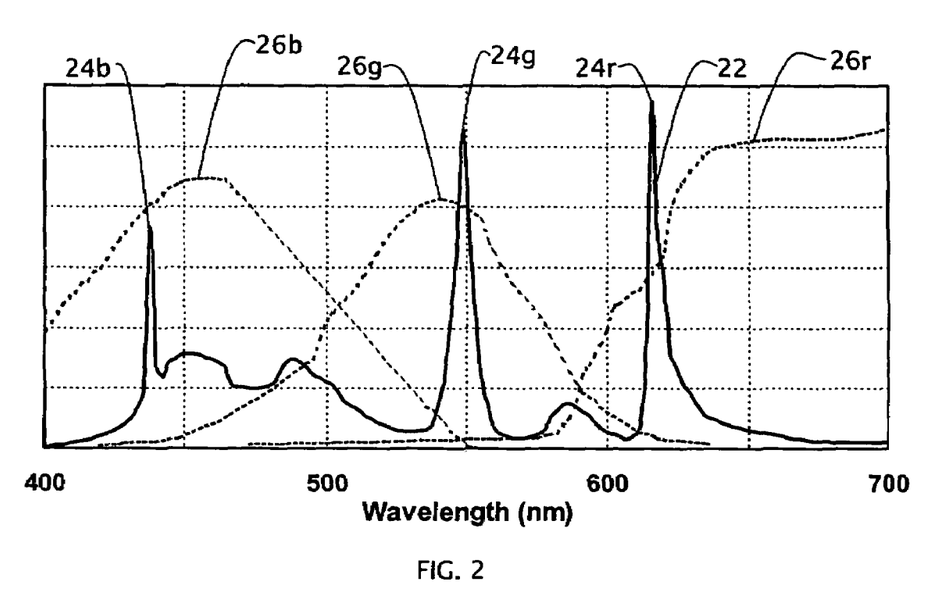
FIG. 2 is a graphical representation of the CCFL backlight emission spectrum (solid) and color filter transmission spectra (dashed) of a typical LCD.

Spectral filtering is described first with reference to FIG. 2. In the current invention, spectral filtering relies on the fact that a typical laptop liquid crystal display uses a cold cathode fluorescent lamp (CCFL) as a backlight, whose spectrum 22 has relatively sharp peaks as shown in FIG. 2 (blue peak 24b, green peak 24g, and red peak 24r). To produce color images, the LCD backlight is selectively spectrally filtered by each pixel in the display by using colored dies (e.g. rgb for red/green/blue pixel displays), so that each pixel produces the desired color light for that portion of the displayed image. The attenuation spectrums for the red 26r, green 26g, and blue 26b dies are generally aligned with the three output peaks 24r, 24g, 24b of the CCFL lamp, as illustrated in FIG. 2.

Figure 3:
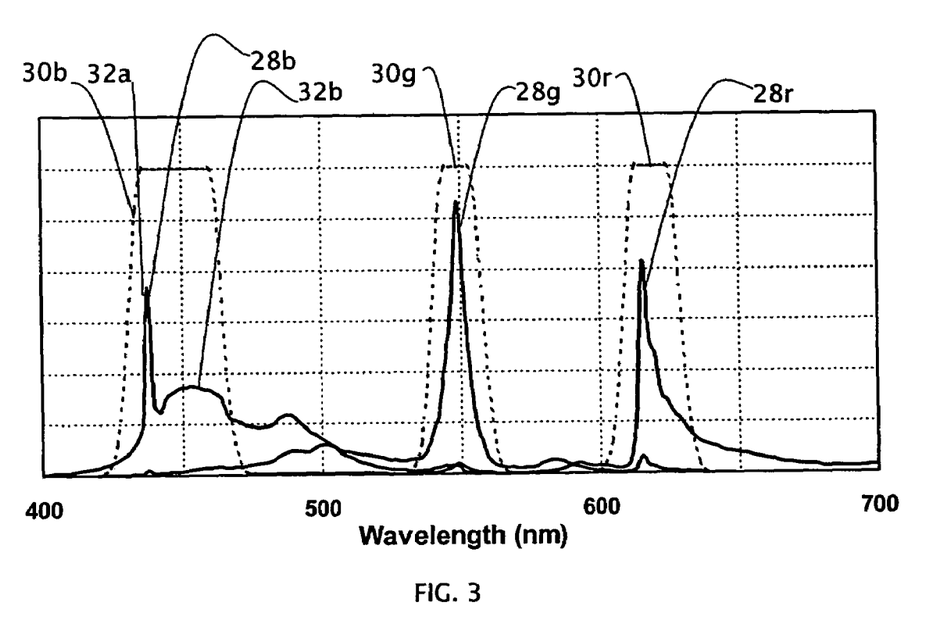
FIG. 3 is a graphical representation of the spectra of colored pixels (solid) of a typical LCD, and the ideal coating transmission spectrum (dashed) for eyewear used to view that display.

FIG. 3 plots the resulting possible spectral emission bands of light from the colored pixels, with red 28r, green 28g and blue 28b emission bands of light being selectively attenuated at each pixel. No attenuation results in the emitted light appearing white. Full attenuation of all three RGB emission bands 28b, 28g, 28r of light results in a black appearance. And various combinations of partial attenuation of the red, green and blue emission bands of light results in the light having any desired color appearance.

In contrast, the spectrum of outdoor ambient light is typically flat across the visible spectrum due to the black body spectral emission from the sun. To selectively enhance the spectral output of the LCD, the lenses 14 (i.e. the material forming the lenses and/or optical coating(s) thereon) are designed to generally transmit relatively narrow bands of light that overlap with the emission bands 28b, 28g, 28r of the LCD, while generally blocking (i.e. absorbing, reflecting, etc.) the remaining visible light outside of the light bands. Specifically, the transmission spectra of the lenses 14 include a relatively narrow transmission band 30b overlapping the emission band 28b (i.e. transmitting generally blue shades of light), a relatively narrow transmission band 30g overlapping the emission band 28g (i.e. transmitting generally green shades of light), and a relatively narrow transmission band 30r overlapping the emission band 28r (i.e. transmitting generally red shades of light). Light falling outside of the transmission bands 30b, 30g, 30r is mostly absorbed, reflected, and/or otherwise blocked by the lenses 14.

Ideally, the transmission bands 30b, 30g, 30r of lenses 14 highly or fully transmit the spectral regions immediately surrounding the corresponding peaks of the emission bands 28b, 28g, 28r, and highly or fully absorbs, reflect and/or otherwise block the other regions of the spectrum. Since the spectral emission within each emission band 28b, 28g, 28r varies, the widths of transmission bands 30b, 30g, 30r can vary as well to optimize performance. For example, the center of transmission band 30r can be shifted toward the longer wavelengths relative to peak emission of emission band 28r, to better transmit the infrared side of the spectral emission of emission band 28r (which tails off more gradually than the blue side of the emission band 28r spectral emission). The transmission band 30g can be more narrow, and more centered on the peak of the emission band 28g spectral emission, because that emission falls off quickly and more symmetrically. The transmission band 28b can be the broadest and centered to transmit both the peak value 32a and a substantial secondary side lobe 32b of emission band 28b.

Figure 4:
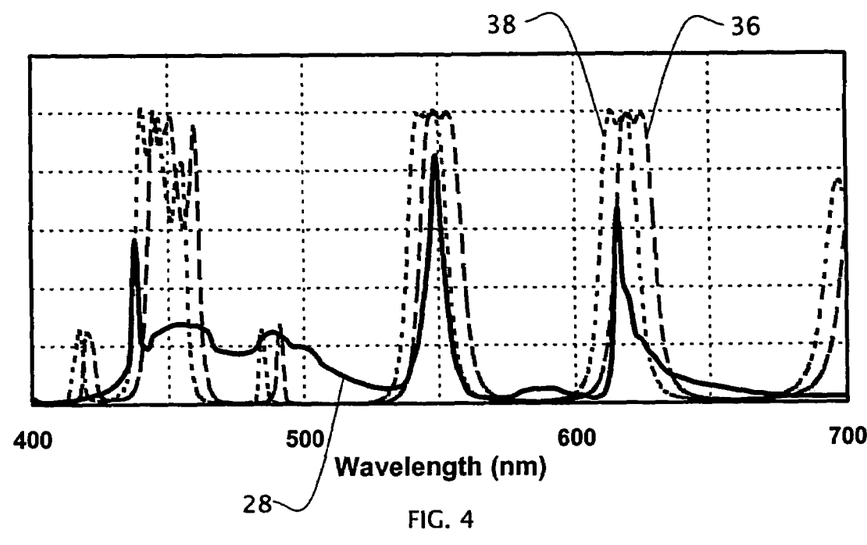
FIG. 4 is a graphical representation of a calculated transmission spectrum of an optimized thin film interference coating on glass at 0 degrees (dashed) and 15 degrees (dotted) angle of incidence, along with CCFL backlight spectrum (solid) for a typical LCD.

Ideally spectral filtering is accomplished with a thin coating of multiple layers of material acting as a spectra filter (e.g. dielectric layers, plastic layers, etc.). These layers would be formed on or adhered to a glass or plastic substrate. The spectral transmission of a calculated exemplary thin film coating for placement on a glass or plastic substrate (for forming lenses 14) is shown in FIG. 4. Coatings are typically optimized by specifying desired transmission at certain wavelengths. This coating was designed by optimizing the differential transmission of the CCFL backlight spectrum 22 over the standard ambient D65 spectrum, while keeping the color white using standard Commission Internationale de l'Éclairage (CIE) Luv calculations. The resulting transmission curves (and thus the transmission bands defined thereby) at 0 and 15 degree angles of incidence are shown as traces 36 and 38 respectively. The calculated brightness increase is 250%, given the attenuation of ambient light and glare outside of these transmission bands. Brightness is enhanced by the fact that, since the overall light entering the retina is decreased, the pupil will increase in size, allowing more of the emitted light from the laptop display to hit the retina. Thus, the display will appear to have brighter white levels when viewed through the eyewear 10 than when viewed without the eyewear 10. In addition, since glare from the screen is attenuated, the black level of the laptop display will appear darker when viewed through the eyewear 10 than when viewed without the eyewear 10.

Polarization Filtering

Polarization filtering relies on the fact that liquid crystal displays emit polarized light. Emitted light from laptop LCD's are typically polarized at either plus or minus forty five degrees from vertical. They are designed to not show polarization artifacts when used with standard polarized glasses, which transmit vertically polarized light and attenuate horizontally polarized light. When looking at a laptop with standard polarized glasses, the light from the display is attenuated by a factor of two. The ambient light, which is unpolarized, is also attenuated by a factor of two. Thus, the ratio of light from the laptop display to ambient light transmitted by conventional polarized glasses remains unchanged.

Figure 5:
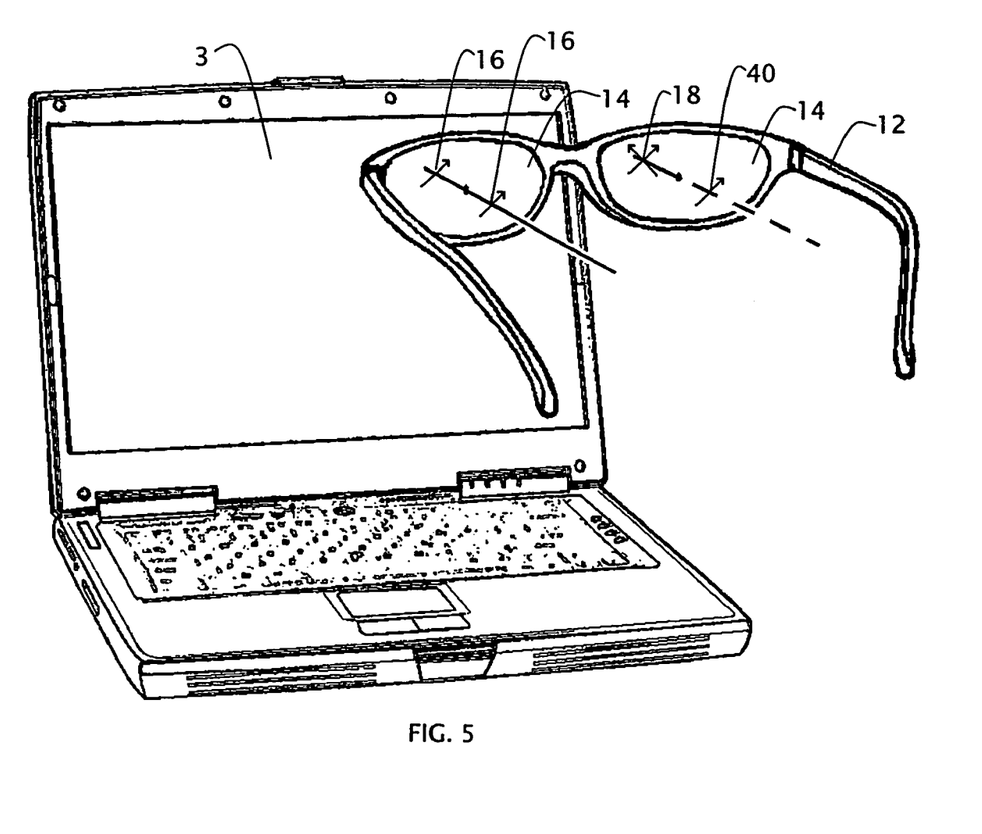
FIG. 5 is a perspective view illustrating the polarization filtering of the eyewear.

Polarization filtering under the present invention is described with reference to FIG. 5. Lenses 14 can be polarized lenses, meaning light components polarized parallel to the polarization axis of the lenses 14 are transmitted, while light components polarized perpendicular to the polarization axis of the lenses 14 are blocked. Lenses 14 each have a polarization axis that is oriented either plus or minus forty five degrees from vertical, matching the polarization of light emitted by laptop LCD 3. More specifically, when the frame is worn on a user's face in a level manner, the polarization axis is oriented 45 degrees from vertical (and thus 45 degrees from horizontal, meaning the polarization axis is oriented 45 degrees from a line passing through both the user's eyes). Thus, light 16 originating from the laptop display 3, which is polarized at forty five degrees from vertical, is transmitted through the forty five degree polarized lenses 14 without undue attenuation (assuming the user's head is not significantly tilted). Ambient unpolarized light 18 passing through the lenses 14 is attenuated by a factor of two (only component of ambient light 40 matching polarization axis of lens is transmitted). Thus, the ratio of light emitted by the laptop display relative to ambient light is doubled when viewed through lenses 14.

Laptops are not all polarized in the same direction. Some are polarized at plus forty five degrees, and some are polarized at minus forty five degrees. Thus, two sets of eyewear 10 having polarization filtering can be offered, one for each type of display. Alternately, lenses 14 can be rotatably supported by frame 12. With this configuration, a single set of eyewear 10 with polarization filtering would be compatible with both LCDs that emit light polarized at plus forty five degrees and with LCDs that emit light polarized at minus forty five degrees, as the user can simply rotate the polarization axes of the lenses 14 to match to polarization output of the LCD being viewed.

Polarization filtering may not work as well with some liquid crystal displays with protective covers, such as those on cell phones. The plastic protective cover is typically molded plastic which has birefringence. The birefringence is dependent on the strain, which is not uniform. This plastic cover, although clear, changes the polarization slightly. However, in most cases, the polarization filtering of lenses 14 will still attenuate ambient light more than the light emitted by the LCD.

Eyewear with spectral filtering combined with polarization filtering can provide up to a 500% increase in the apparent brightness of a laptop screen and reduce glare by the same amount.

Spatial Filtering

Figure 6:
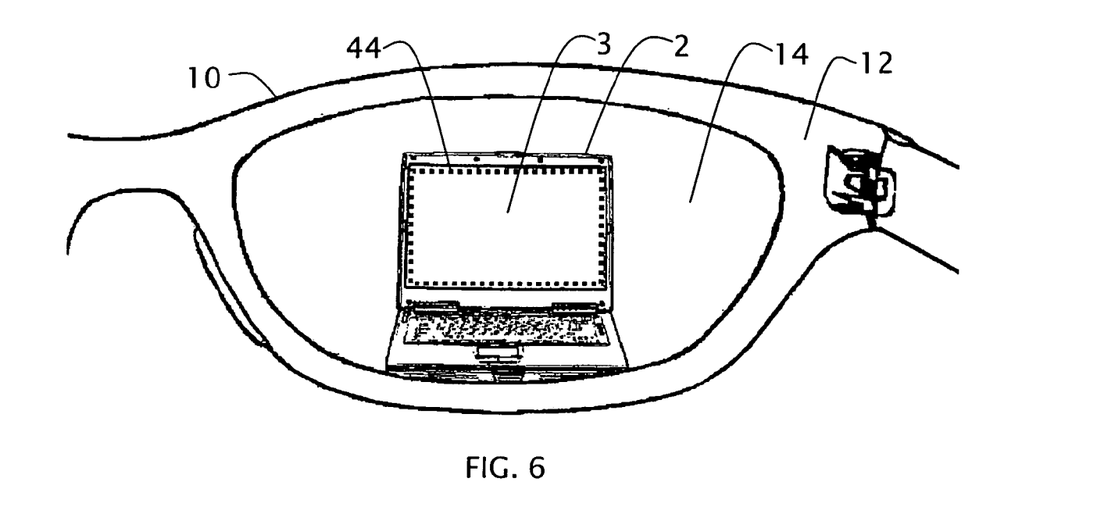
FIG. 6 is a view through the eyewear illustrating the central rectangular region on the eyewear lenses that corresponds to liquid crystal display.

Spatial filtering is described with reference to FIG. 6. When looking through the eyewear 10 at the display 3 of a laptop 2 at a typical arms length, the light emitted by display 3 intersects a central region 44 of lens 14 (outlining a rectangle 44). Spatial filtering is performed by adding tinting (i.e. enhanced attenuation) just to the region of lens 14 outside of the central region 44.

Figure 7A:
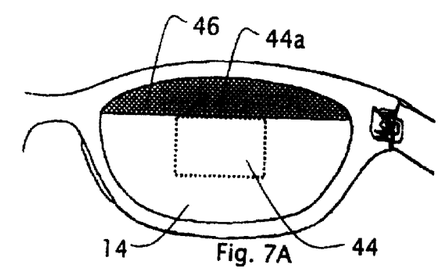
FIGS. 7A-7D are views through the eyewear illustrating patterns of spatial filtering.
Figure 7B:
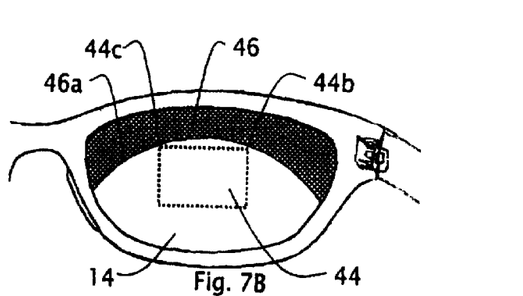
Figure 7C:
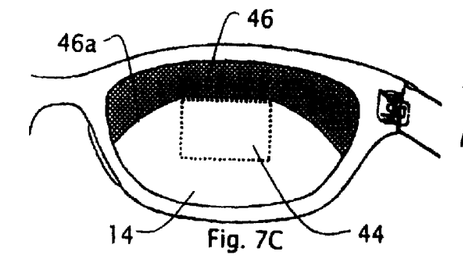
Figure 7D:
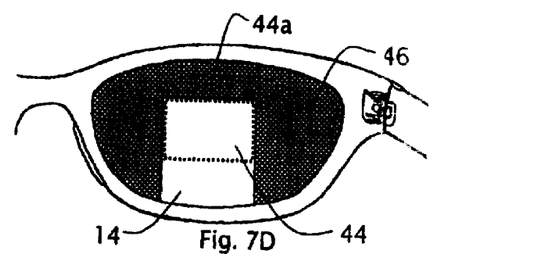

Referring to FIGS. 7A to 7E, the patterns of tinting used can vary depending on application and user preference. In FIG. 7A, the tinting 46 is located above the top edge 44a of the central region 44. This half plane tinting is useful in shading the higher intensity ambient light coming from the sun or sky. The tinting 46 in FIG. 7B has an arced bottom edge 46a which intersects the central region 44 at the two upper corners thereof 44b and 44c. Adding tint to the region between the arced edge 46a and the central region 44 renders the pattern in FIG. 7C. This pattern is similar in shading the sky, but adds some shading on the sides as well. FIG. 7D illustrates tinting 46 above and to the sides of central region 44, while the portion of lens 14 below central portion 44 is left untinted for better viewing of the laptop keyboard. The pattern in FIG. 7D could be changed to add tinting below central portion 44 as well. While the patterns shown in FIGS. 7A-7D are shown with sharp boundaries, graded boundaries can be implemented as well.

Back Reflection

Spectral filtering of ambient light can cause undesirable back-reflections. Two types of undesired back-reflections are better understood with reference to FIG. 8A, which diagrams the spectral filter 53 portion and the polarization filter 54 portion of lens 14 (without showing the glass or plastic substrate and without regard to scale). Arrows indicate the polarization orientation for each light ray. The first type of back-reflection, type I, originates from unpolarized ambient light 57 from behind the users head. This light 57 gets linearly polarized by the polarization filter 54 (attenuating it 50%), is reflected off the spectral filter 53, goes back through the polarization filter 54 unattenuated and reaches the eye 52. The second type of back-reflection, type II, originates from forward propagating light 56 going through the eyewear (from the direction of the LCD screen). This light 56 goes through the spectral filter 53 and polarization filter 54, and reflects 58 off of the users face. Although much of this reflected light is of the spectrum that transmits, rather than reflects, through the spectral filter 53, light originating from higher angles of incidence will have a different spectrum due to the shift of the transmission spectrum of the spectral filter 53 with angle. The reflected light 58, keeps its linear polarization as it goes through the polarizer 54, reflects on the spectral filter 53, and goes back through the polarizer 54 to the eye 52.

Figure 8A:
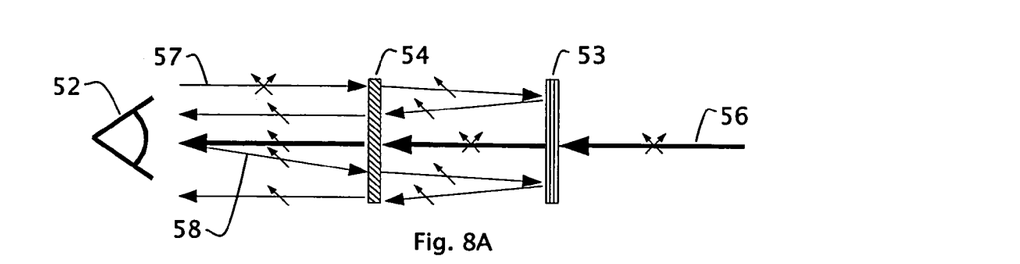
FIGS. 8A-8C are side views illustrating polarizer configurations for reducing eyewear reflections.
Figure 8B:
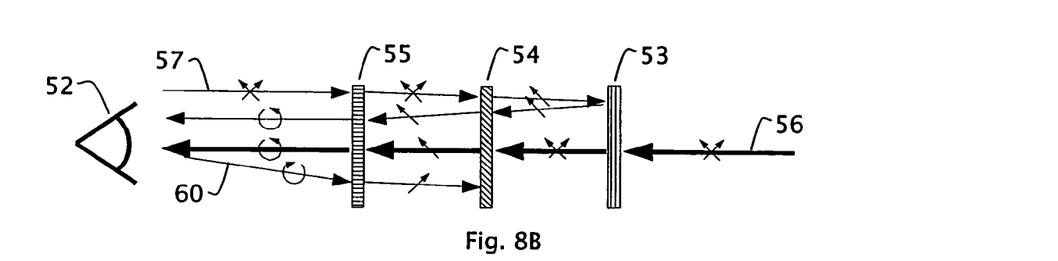

A lens configuration for blocking the type II reflection is shown in FIG. 8B, where a quarter wave plate 55 is placed between the linear polarizer 56 and the eye 52 (preferably as part of the lens assembly 14). The type II light originates from forward propagating light 56 going through the lens 14. The quarter wave plate 55 converts the linear polarized light from the polarizer 54 to circularly polarized light. Circularly polarized light reflects as circularly polarized light 60 (but changes hand such as from left hand to right hand), so that its second pass through quarter wave plate 55 will result in linear polarized light oriented to be blocked by the linear polarizer 54. As is shown in FIG. 8B, however, this configuration still only blocks 50% of the type I reflection due to light 57 originating from behind the head.

Figure 8C:
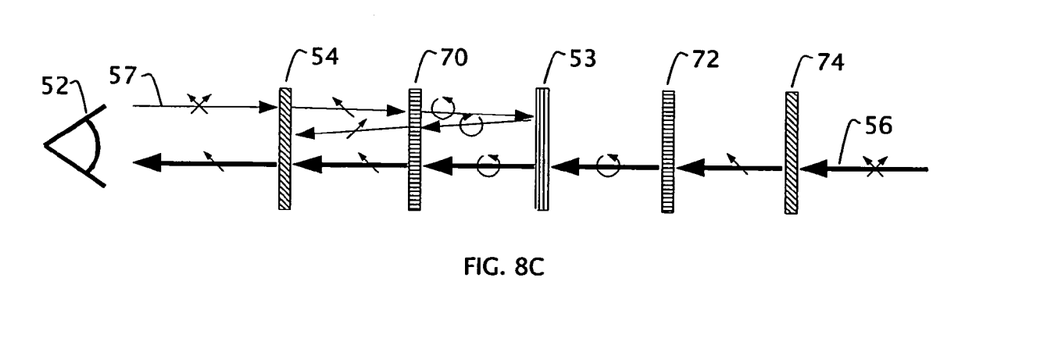

To block both type I and type II reflections, two quarter wave plates (circular polarizers) 70 and 72 can be disposed on either side of the spectral filter 53, with linear polarizers 54 and 74 disposed on either side of the quarter wave plates 70/72, as shown in FIG. 8C. Forward propagating light 56 going through lenses 14 first goes through linear polarizer 74 (which performs the polarization filtering), then through quarter wave plate 72 (converting it to circularly polarized light), then through spectral filter 53, then through quarter wave plate 70 (which turns it back to linearly polarized light), and finally through linear polarizer 54 and into the eye 52. Type I light 57 originating from behind the head first goes through linear polarizer 54 (and gets linearly polarized), then through quarter wave plate 70 (and gets circularly polarized), then reflects off the spectral filter 53 (where the circular polarization changes hand), then back through quarter wave plate 70 where the light gets linearly polarized in an orientation opposite to that of the polarization axis of linear polarizer 54 (which blocks the light). Since unpolarized type I light is completely blocked, polarized type II light is also blocked for the same reasons.

Figure 9:
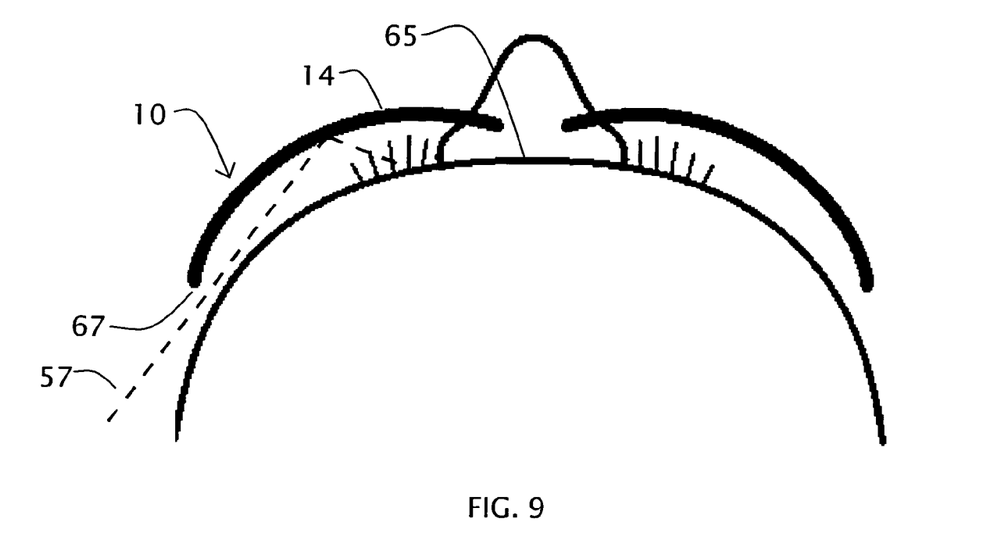
FIG. 9 is a top view illustrating a geometry of eyewear for reducing back reflections.

The transmission through the lens 14 configuration shown in FIG. 8C is slightly lower than that shown in FIG. 8A since the forward propagating light 56 has to go through two linear polarizers, which are typically only 80% transmissive for the correct polarization. Another way to block type I reflected light is to geometrically prevent rearward originating light 57 from reaching the lens 14, as shown in FIG. 9, by minimizing the gap 67 between the user's head 65 and the eyewear 10, which will prevent type I light 57 from reaching the lens 14. A combination of the geometry of FIG. 9 and the polarizer arrangement of FIG. 8B will thus essentially eliminate type I and type II reflections.

Figure 10:
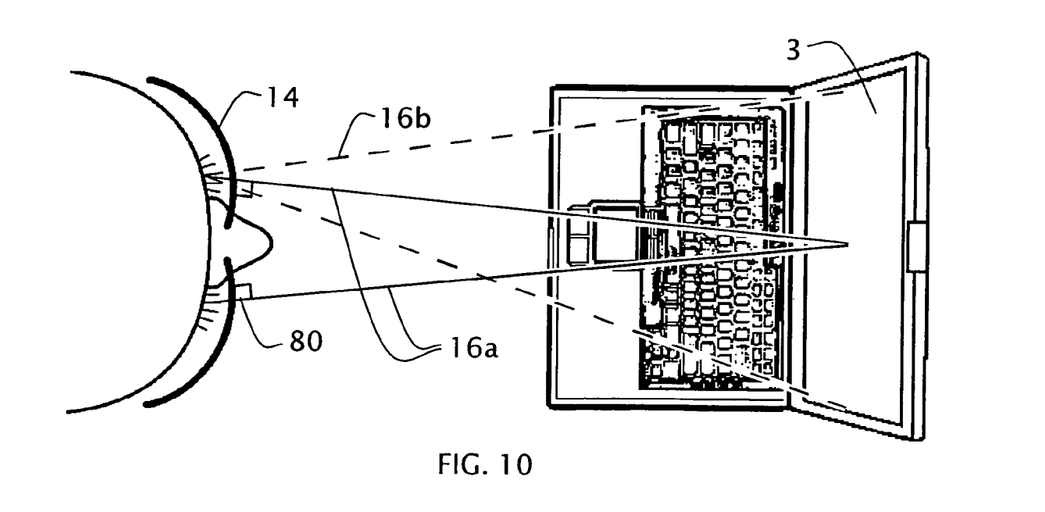
FIG. 10 is a top view illustrating geometry of eyewear that help ensure normal incidence.

FIG. 10 illustrates how to enhance the precision of spectral filtering. As stated above, the spectrum bands of light filtered by lens 14 (for most types of spectral coatings) will be dependent upon the angle of incidence of the light. Coatings are typically designed to operate best at a predetermined angle of incidence. Thus, it is preferable to use a curvature on lens 14 so that light from various portions of the LCD screen making it to the user's eyes is incident on lens 14 as close to that predetermined angle of incidence as possible. Thus, the angle between the light from the center of the screen 16a and the lens is preferably a right angle 80. The angle between the light from the edge of the display 16b and the center of the screen 16a should be less than the angle range that the spectral filter is designed to operate in, which for the design shown in FIG. 4 is 15 degrees.

It is to be understood that the present invention is not limited to the embodiment(s) described above and illustrated herein, but encompasses any and all variations falling within the scope of the appended claims. For example, materials, processes and numerical examples described above are exemplary only, and should not be deemed to limit the claims. The current invention is described in terms of eyewear as standard eyeglasses or sunglasses, but is applicable to any type of element between the display and the eye. These include, but are not limited to clip on lenses which attach to ordinary glasses (i.e. clip on lenses still supported by frame 12), prescription lenses (i.e. the lenses have an optical focusing power), goggles, helmet visors, wearable filters, and contact lenses.

What is claimed is:

1. Eyewear for wearing over a user's eyes, comprising:
an eyeglass frame;
lenses supported by the frame, wherein at least one of material forming the lenses and one or more optical coatings on the lenses are configured to generally transmit three separate visible bands of light while generally blocking any ambient visible light not within the three visible bands of light.

2. The eyewear of claim 1, wherein the three bands of light include a first band of light generally including a blue band of light, a second band of light generally including a green band of light, and a third band of light generally including a red band of light of light.

3. The eyewear of claim 1, wherein the three bands of light generally overlap with and transmit blue, green and red emission bands of light from a cold cathode fluorescent lamp (CCFL).

4. The eyewear of claim 1, wherein the lenses have an optical focusing power.

5. The eyewear of claim 1, wherein the lenses are removably attached to the frame.

6. The eyewear of claim 1, wherein the frame includes:
a front portion for supporting the lenses; and
a pair of stems extending from the front portion to secure the frame to the user's head.

7. The eyewear of claim 1, wherein each of the lenses has a polarization axis oriented at 45 degrees from a line passing through the user's eyes as the frame is worn by the user in a level manner, such that the lenses generally transmit components of light polarized parallel to the polarization axis and generally block components of light polarized orthogonally to the polarization axis.

8. The eyewear of claim 7, wherein each of the lenses comprise:
a filtering layer for the transmitting of the three separate visible bands of light while generally blocking the remaining visible light not within the three visible bands of light;
a linear polarizing layer having the polarization axis; and
a quarter waveplate disposed adjacent the polarizing layer.

9. The eyewear of claim 8, wherein for each of the lenses, the central portion is rectangular shaped.

10. The eyewear of claim 7, wherein each of the lenses comprise:
a filtering layer for the transmitting the three separate visible bands of light while generally blocking the remaining visible light not within the three visible bands of light;
a pair of linear polarizing layers each having the polarization axis and each disposed on opposite sides of the filtering layer; and
a pair of quarter waveplates each disposed on opposite sides of the pair of linear polarizing layers.

11. The eyewear of claim 10, wherein for each of the lenses, the tinted portion includes portions of the lens over and lateral to the central portion.

12. The eyewear of claim 10, wherein for each of the lenses, the tinted portion includes a bottom edge that is arc shaped.

13. The eyewear of claim 7, wherein the lenses are rotatably supported by the frame.

14. The eyewear of claim 1, wherein each of the lenses comprise a tinted portion for at least partially blocking incident light, and a central portion that is not tinted for generally transmitting incident light.

\* \* \* \* \*